(12) United States Patent
Lin

(10) Patent No.: US 7,295,206 B2
(45) Date of Patent: Nov. 13, 2007

(54) INK INPUT REGION ADJUSTMENTS

(75) Inventor: Zhouchen Lin, Beijing (CN)

(73) Assignee: Microsoft Corporation, Redmond, WA (US)

(*) Notice: Subject to any disclaimer, the term of this patent is extended or adjusted under 35 U.S.C. 154(b) by 202 days.

(21) Appl. No.: 11/045,082

(22) Filed: Jan. 31, 2005

(65) Prior Publication Data

US 2006/0170683 A1    Aug. 3, 2006

(51) Int. Cl.
*G06T 11/00* (2006.01)
*G09G 5/00* (2006.01)
*G09G 5/08* (2006.01)
*G06F 3/041* (2006.01)
*G06K 9/00* (2006.01)
*G06K 9/18* (2006.01)

(52) U.S. Cl. ............... 345/467; 345/156; 345/167; 345/168; 345/173; 382/186; 382/187; 382/185

(58) Field of Classification Search ............ 345/467, 345/156, 167–168, 173; 382/185–187
See application file for complete search history.

(56) References Cited

U.S. PATENT DOCUMENTS

| | | | | |
|---|---|---|---|---|
| 5,596,350 A | * | 1/1997 | Capps et al. | 345/173 |
| 5,600,735 A | * | 2/1997 | Seybold | 382/178 |
| 5,864,635 A | * | 1/1999 | Zetts et al. | 382/187 |
| 6,021,218 A | * | 2/2000 | Capps et al. | 382/187 |
| 6,434,581 B1 | * | 8/2002 | Forcier | 715/541 |
| 7,010,165 B2 | * | 3/2006 | Hullender et al. | 382/186 |
| 2003/0214531 A1 | * | 11/2003 | Chambers et al. | 345/764 |
| 2003/0215142 A1 | * | 11/2003 | Gounares et al. | 382/190 |
| 2004/0091176 A1 | * | 5/2004 | Bai | 382/305 |
| 2005/0135678 A1 | * | 6/2005 | Wecker et al. | 382/186 |

OTHER PUBLICATIONS

Zhu et al., "Optical polygonal approximation of digitized curves", IEE Proc.-Vis Image Signal Process., vol. 144, No. 1, Feb. 1997.
Sklansky et al., "Fast Polygonal Approximation of Digitized Curves", Pattern Recognition vol. 12pp. 327-331, 1980.

* cited by examiner

*Primary Examiner*—Jin-Cheng Wang
(74) *Attorney, Agent, or Firm*—Banner & Witcoff, Ltd

(57) ABSTRACT

Aspects of the present invention relate to the creation of an ink font. Based on characteristics of handwritten characters, the collection of characters may be scaled so as to adjust the size of the font to match predefined size values or relationships.

19 Claims, 8 Drawing Sheets

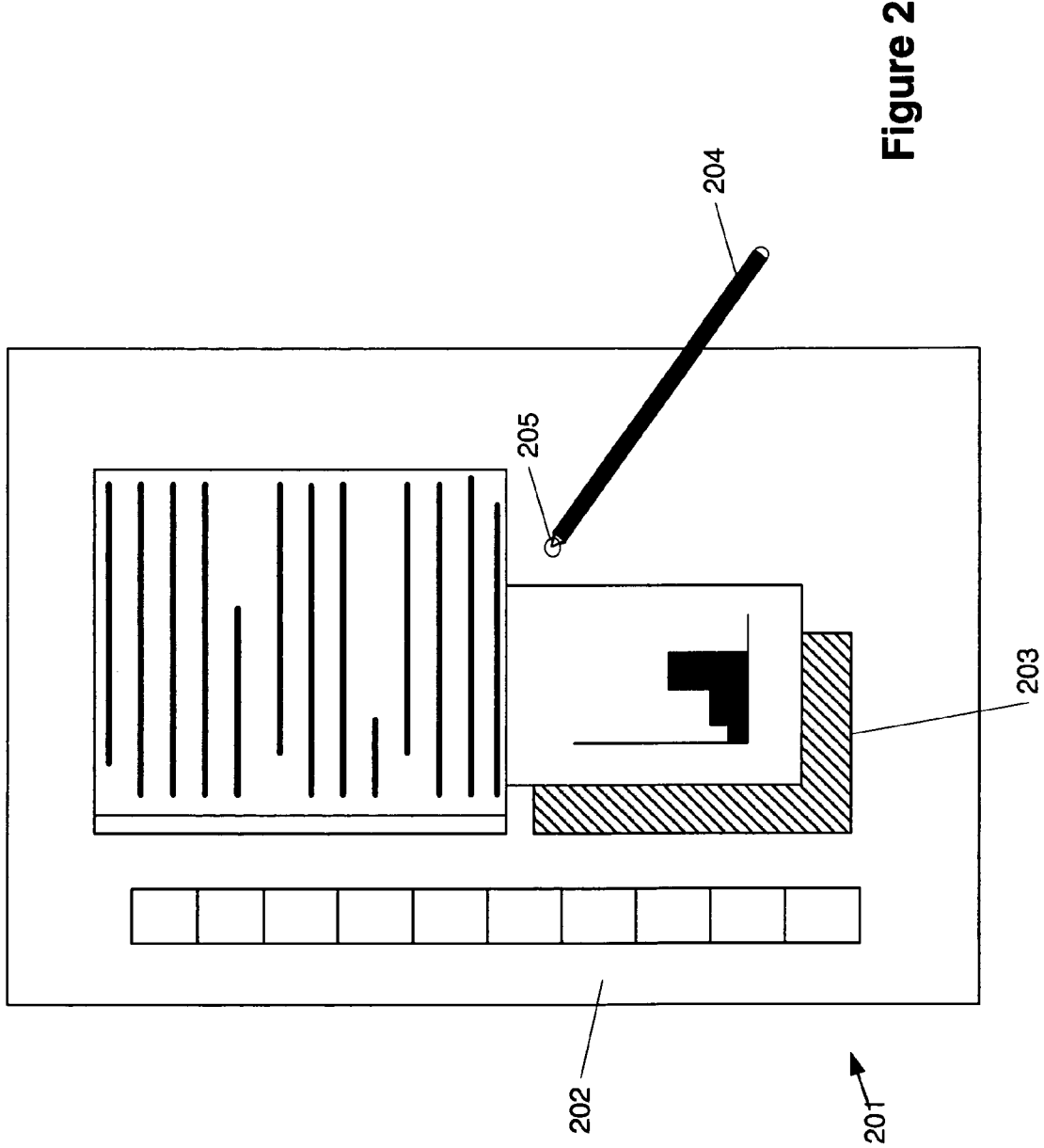

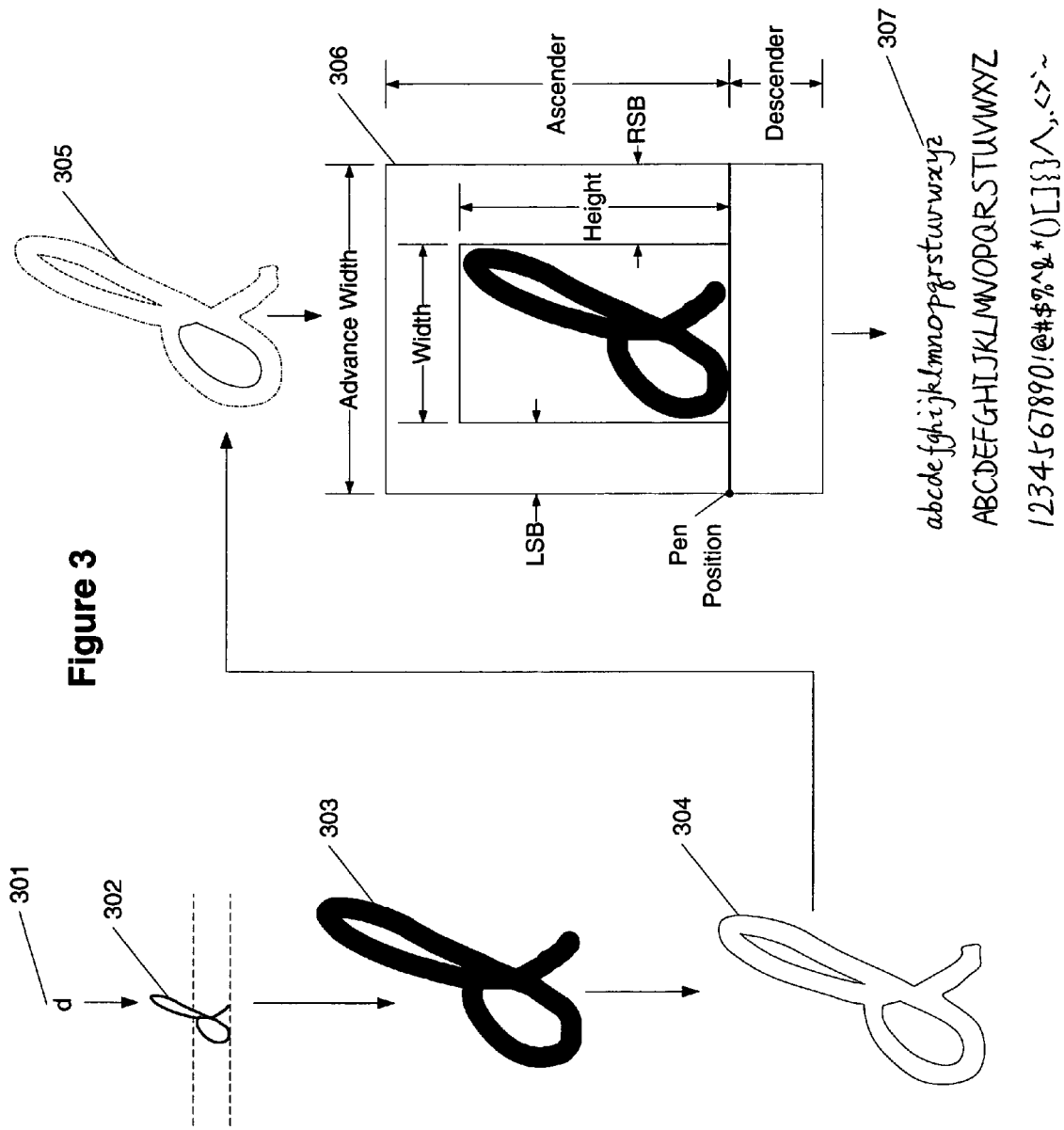

INK INPUT REGION ADJUSTMENTS

BACKGROUND OF THE INVENTION

1. Field of the Invention

Aspects of the present invention relate to computer systems. More particularly, aspects of the present invention relate to creation of a font based on a user's handwriting.

2. Description of Related Art

Typical computer systems, especially computer systems using graphical user interface (GUI) systems, such as Microsoft WINDOWS, are optimized for accepting user input from one or more discrete input devices such as a keyboard for entering text, and a pointing device such as a mouse with one or more buttons for driving the user interface.

Some computing systems have expanded the input and interaction systems available to a user by allowing the use of a stylus to input information into the systems. The stylus may supplement or replace the keyboard (for data entry) or mouse (for control). Some computing systems receive handwritten electronic information or electronic ink and immediately attempt to convert the electronic ink into text. Other systems permit the electronic ink to remain in the handwritten form.

Users are now able to personalize notes and other documents with their handwriting. In some situations, users may convert their handwriting into a font. However, fonts created by merely capturing handwriting lead to shifted characters (shifted up or down, left or right). In other situations, extraneous data may be included in handwritten fonts that prevent clean fonts from being generated.

An improved font creation process and system is needed.

BRIEF SUMMARY OF THE INVENTION

Aspects of the invention address one or more problems described above, thereby providing an ink font based on a user's handwriting. In some aspects of the invention, ink information is modified to correct the placement and/or size of a font. In other aspects, an input for receiving ink may be modified based on input of selected characters. These and other aspects are described in relation to the drawings.

BRIEF DESCRIPTION OF THE DRAWINGS

Aspects of the present invention are illustrated by way of example and not limited to the accompanying figures in which like reference numerals indicate similar elements.

FIG. 2 show a stylus-based computing system that may be used in accordance with aspects of the present invention.

FIG. 3 shows a process for creating an ink font in accordance with aspects of the present invention.

DETAILED DESCRIPTION OF THE INVENTION

Figure 1:
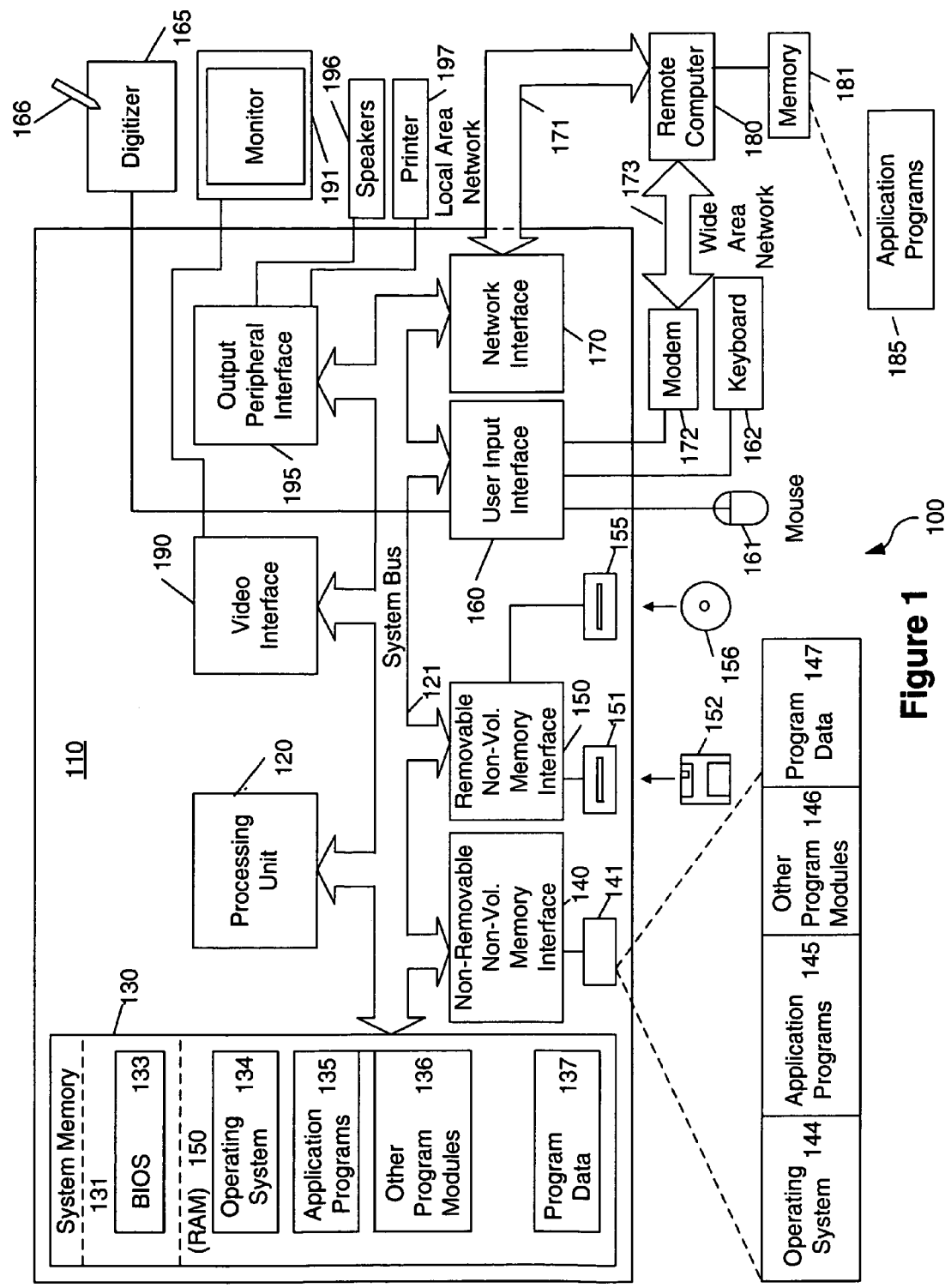
FIG. 1 shows a general-purpose computing environment that may support aspects of the present invention.

Aspects of the present invention relate to creating a font from handwritten ink.

This document is divided into sections to assist the reader. These sections include: personal ink fonts, characteristics of ink, terms, general-purpose computing environment, ink font generation, ink collection, re-rendering, edge extraction, glyph generation, glyph size and position adjustment, font generation and font registration, special considerations, and input region adjustment.

It is noted that various connections are set forth between elements in the following description. It is noted that these connections in general and, unless specified otherwise, may be direct or indirect and that this specification is not intended to be limiting in this respect.

Personal Ink Fonts

In a world with a wealth of available fonts, personal expression through a choice of fonts is limited. Personal ink fonts, derived from a user's own handwriting, are truly expressive of the user. A problem with current systems that create ink fonts based on user input is that they operate as screen capture utilities based on regimented input regions. The fixed input windows yield odd results based on at least one of a plurality of factors including a character shifted in one direction or another, the character having an abnormal size, or the input region being of a size that is not conducive to receiving handwritten ink.

Aspects of the present invention address one or more of these concerns with conventional approaches by performing at least one of scaling or sizing on received ink. Other aspects of the present invention relate to adjusting a created ink font based on spacing of known font sets.

Characteristics of Ink

As known to users who use ink pens, physical ink (the kind laid down on paper using a pen with an ink reservoir) may convey more information than a series of coordinates connected by line segments. For example, physical ink can reflect pen pressure (by the thickness of the ink), pen angle (by the shape of the line or curve segments and the behavior of the ink around discreet points), and the speed of the nib of the pen (by the straightness, line width, and line width changes over the course of a line or curve). Further examples include the way ink is absorbed into the fibers of paper or other surface it is deposited on. These subtle characteristics also aid in conveying the above listed properties. Because of these additional properties, emotion, personality, emphasis and so forth can be more instantaneously conveyed than with uniform line width between points.

Electronic ink (or ink) relates to the capture and display of electronic information captured when a user uses a stylus-based input device. Electronic ink refers to a sequence or any arbitrary collection of strokes, where each stroke is comprised of a sequence of points. The strokes may have been drawn or collected at the same time or may have been drawn or collected at independent times and locations and for independent reasons. The points may be represented using a variety of known techniques including Cartesian coordinates (X, Y), polar coordinates (r, Θ), and other techniques as known in the art. Electronic ink may include representations of properties of real ink including pressure, angle, speed, color, stylus size, and ink opacity. Electronic ink may further include other properties including the order of how ink was deposited on a page (a raster pattern of left to right then down for most western languages), a timestamp (indicating when the ink was deposited), indication of the author of the ink, and the originating device (at least one of an identification of a machine upon which the ink was drawn or an identification of the pen used to deposit the ink) among other information.

Terms

| | |
|---|---|
| Ink | A sequence or set of strokes with properties. A sequence of strokes may include strokes in an ordered form. The sequence may be ordered by the time captured or by where the strokes appear on a page or in collaborative situations by the author of the ink. Other orders are possible. A set of strokes may include sequences of strokes or unordered strokes or any combination thereof. Further, some properties may be unique to each stroke or point in the stroke (for example, pressure, speed, angle, and the like). These properties may be stored at the stroke or point level, and not at the ink level |
| Stroke | A sequence or set of captured points. For example, when rendered, the sequence of points may be connected with lines. Alternatively, the stroke may be represented as a point and a vector in the direction of the next point. In short, a stroke is intended to encompass any representation of points or segments relating to ink, irrespective of the underlying representation of points and/or what connects the points. |
| Point | Information defining a location in space. For example, the points may be defined relative to a capturing space (for example, points on a digitizer), a virtual ink space (the coordinates in a space into which captured ink is placed), and/or display space (the points or pixels of a display device). |

General-Purpose Computing Environment

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc., that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile and both removable and non-removable media implemented in any method or technology for storage of information such as computer readable instructions, data structures, program modules, or other data. Computer storage media includes, but is not limited to, RAM, ROM, LEPROM, flash memory or other memory technology, CD-ROM, digital versatile disks (DYD) or other optical disk storage, magnetic cassettes, magnetic tape, magnetic disk storage or other magnetic storage devices, or any other medium which can be used to store the desired information and which can accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection and wireless media such as acoustic, RF, infrared, and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 20 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

In some aspects, a pen digitizer 165 and accompanying pen or stylus 166 are provided in order to digitally capture freehand input. Although a direct connection between the pen digitizer 165 and the user input interface 160 is shown, in practice, the pen digitizer 165 may be coupled to the processing unit 110 directly, parallel port or other interface and the system bus 130 by any technique including wirelessly. Also, the pen 166 may have a camera associated with it and a transceiver for wirelessly transmitting image information captured by the camera to an interface interacting with bus 130. Further, the pen may have other sensing systems in addition to or in place of the camera for determining strokes of electronic ink including accelerometers, magnetometers, and gyroscopes.

It will be appreciated that the network connections shown are illustrative and other techniques for establishing a communications link between the computers can be used. The existence of any of various well-known protocols such as TCP/IP, Ethernet, FTP, HTTP and the like is presumed, and the system can be operated in a client-server configuration to permit a user to retrieve web pages from a web-based server. Any of various conventional web browsers can be used to display and manipulate data on web pages.

FIG. 2 illustrates an illustrative tablet PC 201 that can be used in accordance with various aspects of the present invention. Any or all of the features, subsystems, and functions in the system of FIG. 1 can be included in the computer of FIG. 2. Tablet PC 201 includes a large display surface 202, e.g., a digitizing flat panel display, preferably, a liquid crystal display (LCD) screen, on which a plurality of windows 203 is displayed. Using stylus 204, a user can select, highlight, and/or write on the digitizing display surface 202. Examples of suitable digitizing display surfaces 202 include electromagnetic pen digitizers, such as Mutoh or Wacom pen digitizers. Other types of pen digitizers, e.g., optical digitizers, may also be used. Tablet PC 201 interprets gestures made using stylus 204 in order to manipulate data, enter text, create drawings, and/or execute conventional computer application tasks such as spreadsheets, word processing programs, and the like.

The stylus 204 may be equipped with one or more buttons or other features to augment its selection capabilities. In one embodiment, the stylus 204 could be implemented as a "pencil" or "pen", in which one end constitutes a writing portion and the other end constitutes an "eraser" end, and which, when moved across the display, indicates portions of the display are to be erased. Other types of input devices, such as a mouse, trackball, or the like could be used. Additionally, a user's own finger could be the stylus 204 and used for selecting or indicating portions of the displayed image on a touch-sensitive or proximity-sensitive display. Consequently, the term "user input device", as used herein, is intended to have a broad definition and encompasses many variations on well-known input devices such as stylus 204. Region 205 shows a feedback region or contact region permitting the user to determine where the stylus 204 as contacted the display surface 202.

In various embodiments, the system provides an ink platform as a set of COM (component object model) services that an application can use to capture, manipulate, and store ink. One service enables an application to read and write ink using the disclosed representations of ink. The ink platform may also include a mark-up language including a language like the extensible markup language (XML). Further, the system may use DCOM as another implementation. Yet further implementations may be used including the Win32 programming model and the Net programming model from Microsoft Corporation.

Ink Font Generation

FIG. 3 describes a process for creating ink fonts. Conventional systems merely capture ink. Aspects of the present invention take received ink and perform additional processings on the ink to improve its usability as an actual font. FIG. 3 shows an example of the creation of the lower case letter "d". First, in step 301, a user is requested to write the letter "d." Next, in step 302, the user writes the letter "d." In step 303, the captured ink is rendered at a larger size. In step, 304, an outline from the ink is determined. In step 305, the edges are extracted and erroneous data removed. In step 306, a rendered glyph is adjusted. Finally, in step 307, the rendered glyph of the letter "d" is combined with others to form a completed font. FIG. 3 is described in additional detail below.

Ink Collection

Ink collection is an initial capturing of ink information. In one example, a user may be requested to write each letter in sequence. In another example, a user may be asked to write a first set of letters where information can be determined from these initial characters to allow the system to modify an input region. The modified input region may be more comfortable for the user to input the remaining characters.

For instance, a user may first input middle-zone letters. Middle zone letters are those letters that have no ascenders or descenders (components that extend above a middle line or below a base line). Illustrative letters include {a, c, e, m, n, o, r, s, u, v, w, and x}. Each letter may be written in a box. Alternatively, each may be written in a general region, not confined to a box.

Next, the system calculates the average height H of the middle zone characters (for instance, the system calculates the average height of 12 handwritten characters if 12 characters are input). The system next makes a height of the middle zone to be H when the user inputs the rest characters. In this way, the system adjusts the height of the middle zone to be most comfortable for the user. The benefit is that the user's resultant handwriting will be more natural than if the size of the handwriting input was confined to a system-defined input region. Further, the system may also collect the stroke points' coordinates and pressure. If no pressure information is available, the pressure can be set at the default value.

Re-Rendering

Ink re-rendering adjusts received ink to make it more apt to be converted into a usable font in accordance with aspects of the present invention. In general, the ink strokes collected are too small. Also, a captured width may be only one pixel of the screen. Zooming the inks may be used to ensure the strokes are wide enough so that the system can extract edges exactly. In one example, the size of the ink may be increased by a factor of 4. It is appreciated that re-rendering at a larger size may not be needed if the resolution of a digitizer is high enough to capture ink widths with at least some appreciable width.

Next, the system re-renders the ink at the larger size. For instance, any ink renderer may be used. In one example, one may use the InkRenderer of Tablet PC Ink SDK to render the ink. InkRenderer can render anti-aliased ink with pressure and different pen tip type. Of course, other renderers may be used as desired by a developer or user.

Edge Extraction

Edge extraction may be performed next. Edge extraction is known in the art. Step 304 shows an example of edge extraction. Here, any edge extraction system may be used. The following is described for illustrative purposes only.

First, the received ink is passed through a threshold filter (also referred to as 'thresholding') to convert the ink into a binary on/off state. For instance, an 8 bit grey ink may be converted using a simple filter to pure black ink.

Figure 4:
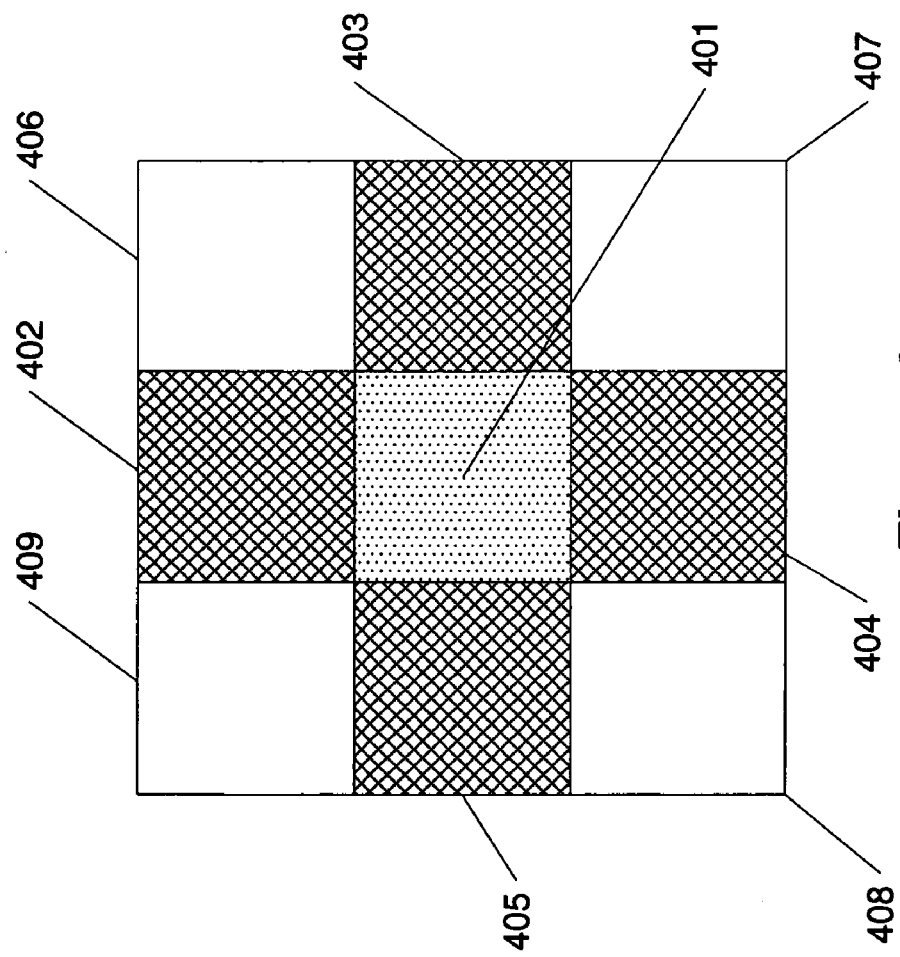
FIG. 4 shows edge selection in accordance with aspects of the present invention.

Next, the system extracts edge points. Here, referring to FIG. 4, point 401 is considered an edge point if point 401 is black and at least one of points 402-409 is white.

Again, any edge extraction methods may be used in conjunction with aspects of the present invention.

Glyph Generation

Figure 5:
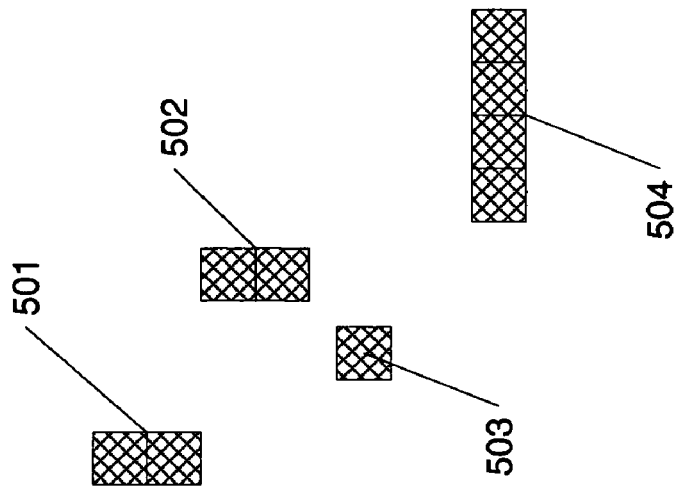
FIG. 5 shows found edges to be deleted in accordance with aspects of the present invention.
Figure 7:
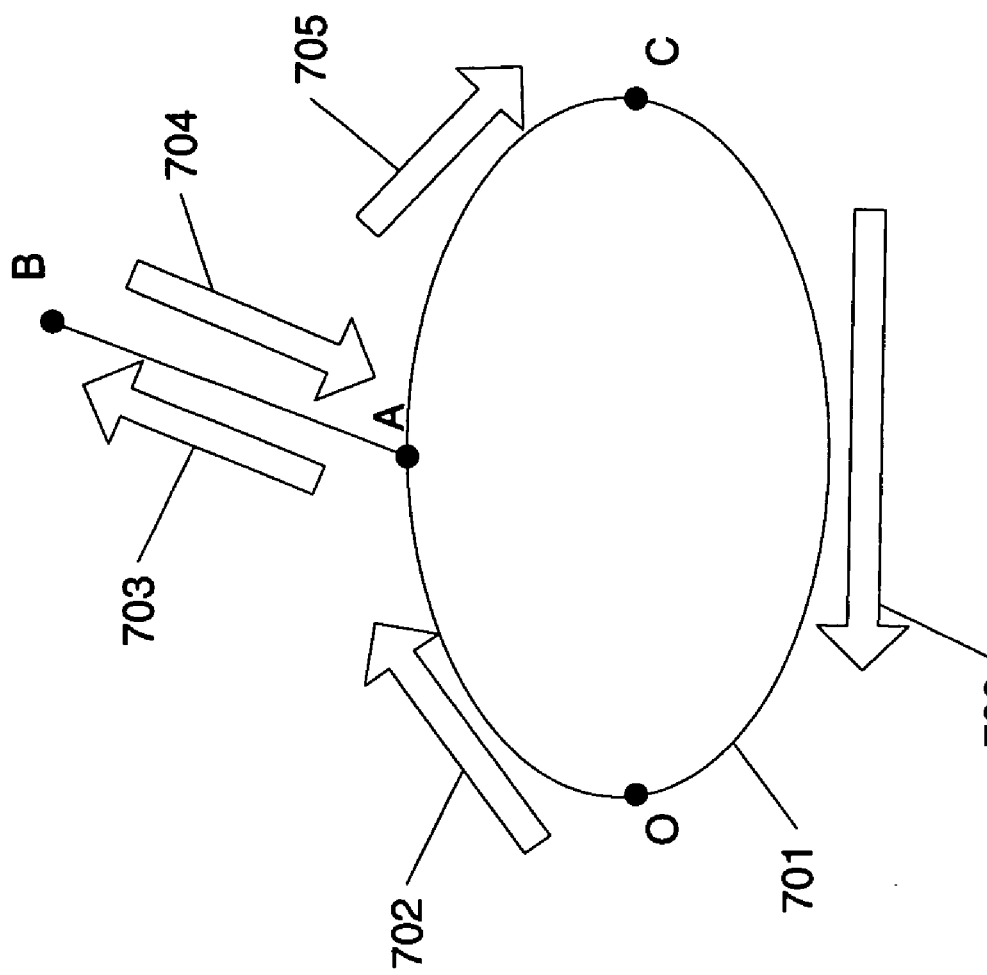
FIG. 7 shows edge cleanup in accordance with aspects of the present invention.
Figure 6:
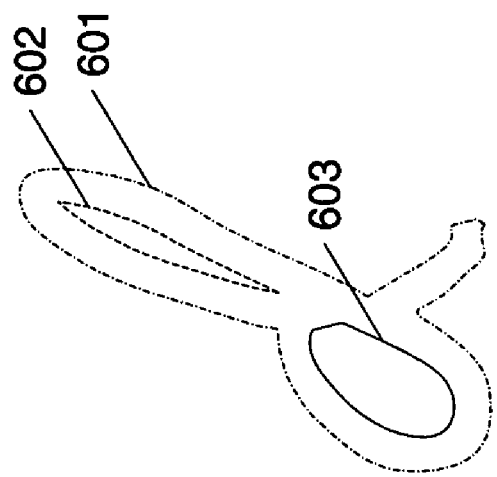
FIG. 6 shows a result of edge detection in accordance with aspects of the present invention.

Glyph Generation is the next step in the process. Here, a glyph is generated that represents the shape of the ink. The above edge extraction step as shown in connection with FIG. 4 may generate unusable information. For example, as shown in FIG. 5, singular point or points that are unconnected to any other shape may result. Glyph generation removes isolated or single end points 501-504 as shown in FIG. 5. These points may represent segments that are not closed. FIG. 6 shows a glyph having been generated. Curves 601-603 represent closed curves associated with the glyph. To remove any remaining non-closed segments, a search may be performed to eliminate any one-way segments as shown in FIG. 7.

From an initial point O on curve 701, a search is conducted for one-way segments. The system follows curve 701 in the direction 702 to point A. Next, the system follows the curve in the direction 703 to point B. It then traces back to point A in the direction 704 then on to point C (in the direction 705) then back to point O in direction 706.

When the search arrives at B, it finds that B has no neighbor and it is not the end point O of closed loop 701. The process then returns to A and discards the points between A and B. The process continues from A toward C and until it reaches point O. Then the process finds the right outline {O->A->C->O} and discards the portion from A to B.

Closed curves may then be re-sampled and approximated by polygons. The resampling may keep all points or a subset of the points. For instance, one may keep one in every two or one in every three points. An example of resampling using one of three points is shown in Sklansky's polygonal approximation algorithm (Sklansky J. and Gonzalez V., Fast Polygonal Approximation of Digitized Curves. Pattern Recognition, Vol. 12, pp. 327-331, 1980.). Next, one may determine Bezier control points of the closed curves. Determination of Bezier control points are known in the art.

Glyph Size and Position Adjustment

Figure 9:
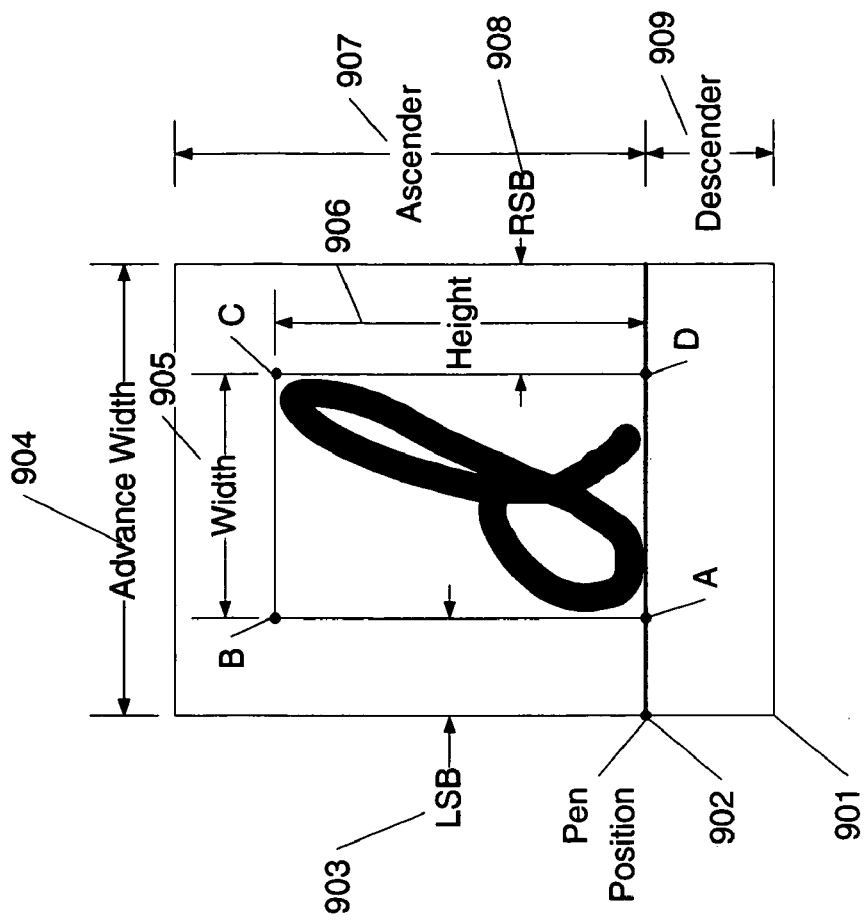
FIG. 9 shows distances associated with a character in accordance with aspects of the present invention.
Figure 8:
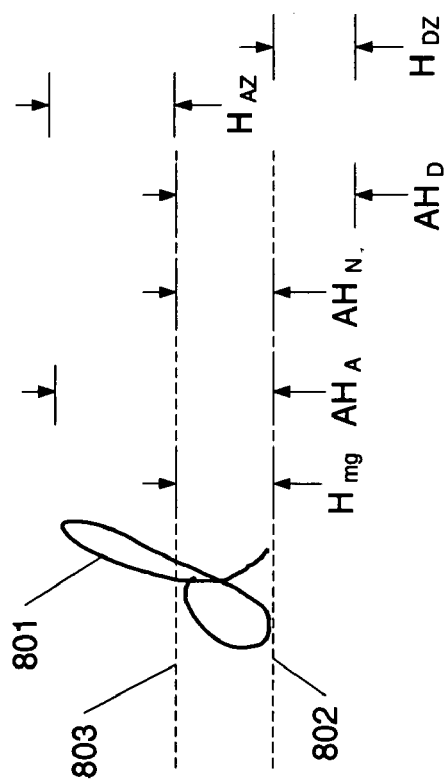
FIG. 8 shows various heights determined from ink in accordance with aspects of the present invention.

FIGS. 8 and 9 illustrate glyph size and position adjustment.

In a True-Type font file, there are 6 values related to glyph size & position. FIG. 9 shows these values in relation to a character in a True-Type font. Here, the character 901 is bounded by a number of distances and descriptive characteristics. A pen position 902 may also be used as a reference. The six values are the following: LSB (left side bearing) 903, advance width 904, and the glyph's leftmost position (horizontal coordinates of points A and B), topmost position (vertical coordinates of points B and C), rightmost position (horizontal coordinates of points C and D), and bottommost coordinate (vertical coordinates of points A and D). From these dimensions, the other characteristics can be determined. For instance, the Ascender height 907 can be determined from the bottommost position to the topmost position. Similarly, the RSB (right side bearing) can be determined from the advance width 904 minus the LSB 903 minus the width (the distance between the leftmost points and the rightmost points).

The values for the LSB and advance width may be determined by a user or may be copied from other known fonts. For example, one may use the LSB and advance width from Times New Roman, Arial, Garamond, or other fonts. One may experiment to determine which font looks best with his or her handwriting.

The pen position 902 should be the same as that of other fonts to ensure that different fonts align on the same horizontal line. The ascender and descender values may have a maximum dependent on the values chosen for the font. For instance, with Times New Roman, the ascender value is approximately 1850 and descender about −445. These predefined values of maximum ascender and descender values have the effect of requiring a handwritten font be scaled to adjust the font to ensure that all ascenders and descenders fall within the maximum values. For instance, if a person's handwriting has a large descender relative to the middle of a character, the system may scale the handwriting down to keep the descender within the maximum size. To keep the size of each character in the font the same size as every other letter, all characters may be scaled by the same amount.

Figure 10:
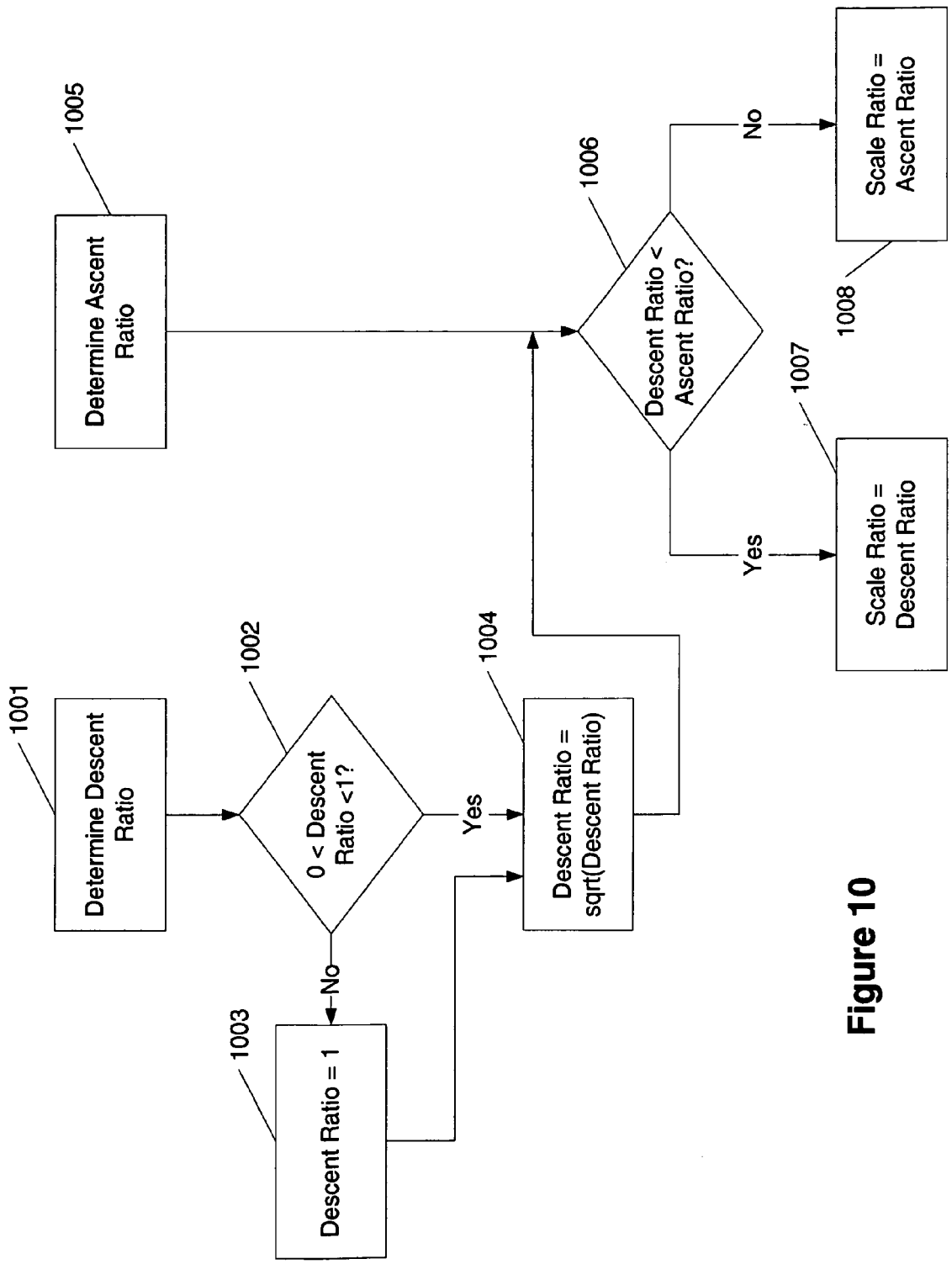
FIG. 10 shows a process for determining ratios in accordance with aspects of the present invention.

FIG. 10 shows a procedure for scaling a font. For the following description of FIG. 10, characters are separated into three groups: normal, ascent, and decent. Normal characters include {a, c, e, m, n, o, r, s, u, v, w, and x}. These characters are characterized in that they are all formed in middle zone Hmg from FIG. 8. Ascent characters include {b, d, h, k, l, t, A~Z (all capital letters), 0~9 (all digits)}. These characters are formed in both the middle zone Hmg and the ascent zone Haz. Descent characters include {g, p, q, y}. These letters are formed in the middle zone Hmg and the descent zone Hdz.

$H_{mg}$ relates to the height of normal characters as associated with a font. For example, in Time New Roman, the height of normal characters is 958. $AH_n$ relates to the average height of handwritten normal characters. This means that sometimes $AH_n$ may not always equal $H_{mg}$, although they represent similar concepts.

Because the descender in handwriting is usually longer than that in printing, to ensure that the decent portion of Descent group be displayed entirely, the characters can be shrunk. In one example, a descender can be set to −442, ascender set to 1835, and the normal height of middle zone (denoted by Hmg) set to 958. Referring to FIG. 8, $AH_N$, $AH_A$, and $AH_D$ are the average heights of normal, ascent, and descent characters respectively. The ratio to scale the characters may be determined as shown in relation to FIG. 10.

In step 1001 of FIG. 10, the descent ratio is determined. The descent ratio may be determined as follows:

Descent Ratio=$(-\text{Descender})*AH_N/(H_{mg}*(A_{HD}-AH_N))$

Next, in step 1002, if the descent ratio is not between 0 and 1, the descent ratio is set equal to 1 in step 1003. If yes from step 1002, then the descent ratio is set equal to the square root of the descent ratio in step 1004.

In step 1005, the ascent ratio is determined. The ascent ratio may be determined as follows:

Ascent Ratio=Ascender*$AH_N/(H_{mg}*AH_A)$

In step 1006, if the descent ratio is less than the ascent ratio, then the scale ratio is set equal to the descent ratio in step 1007. If not, then the scale ratio is set equal to the ascent ratio in step 1008. Alternatively, this may be represented as the Scale Ratio is set equal to the minimum of the Ascent Ratio and the Descent Ratio.

The system may accept the scaled font as scaled. Alternatively, it may further modify the font to account for various items. The following list specific items that can be further modified to adjust various elements of the font. The following lists specific characters that may be modified (size and placement) based on a user's preference.

a. The letter i's height calculation may be based on its lower portion equals the height of normal characters and its top does not exceed that of the ascent group.

b. The letter j's height calculation may be based on its lower portion equals the height of descent characters and its top does not exceed that of the ascent group.

c. The letter f may scale with the scale ratio. The letter f's baseline may be the input baseline. Moreover, its top may equal the top of ascent group. Its bottom may equal the baseline or descent group's bottom, depending on how low its bottom is. For example, one may apply the following: if the part of 'f' below the baseline is lower than ⅓ of the descendent part of descent group, and then the bottom of 'f' may be the bottom of descent group. Otherwise, it is set as the baseline.

d. The letter 'z' may also scale with the scale ratio. Its top may equal the top of normal group and its bottom equals the normal group or descent group's bottom, depending on how low is its bottom. For instance, if the part of 'z' below the baseline is lower than ⅓ of the descendent part of descent group, then the bottom of 'z' will be the bottom of descent group. Otherwise, it may equal the baseline. It is appreciated that there are multiple ways of writing the letter "z" including "z" and "Z".

e. @ may have the same vertical position and height as other symbol characters.

f. {,},(,)[,] may be translated in vertical position to let their middle position equal that of the normal characters' middle position.

g. "_" may have the same position with the bottom of decent characters.

h. For all symbols listed above, their top can be lower than the top of ascent characters, and their bottom can be higher than the bottom of descent characters.

Font Generation and Font Registration

The .ttf file includes a number of tables. Some tables are optional. But there are at least 10 tables: head, hhea, maxp, os/2, hmtx, cmap, loca, post, name, and glyf must be filled in. The .ttf file also includes an optional table: gasp. For ink fonts, all the tables may be copied from an existing font (for instance, Arial or Times New Roman). However, some parameters in different tables should be adjusted according to the ink font. For instance, the hmtx table stores the symbol's advance width and lsb. The glyf table stores the glyphs'data & their bounding boxes. The loca table stores every symbol data's position in glyf table. The name table store the new font's name and type.

The created font file will finally be copied to the system font directory and added to the listing of available fonts.

Input Region Adjustment

Figure 11:
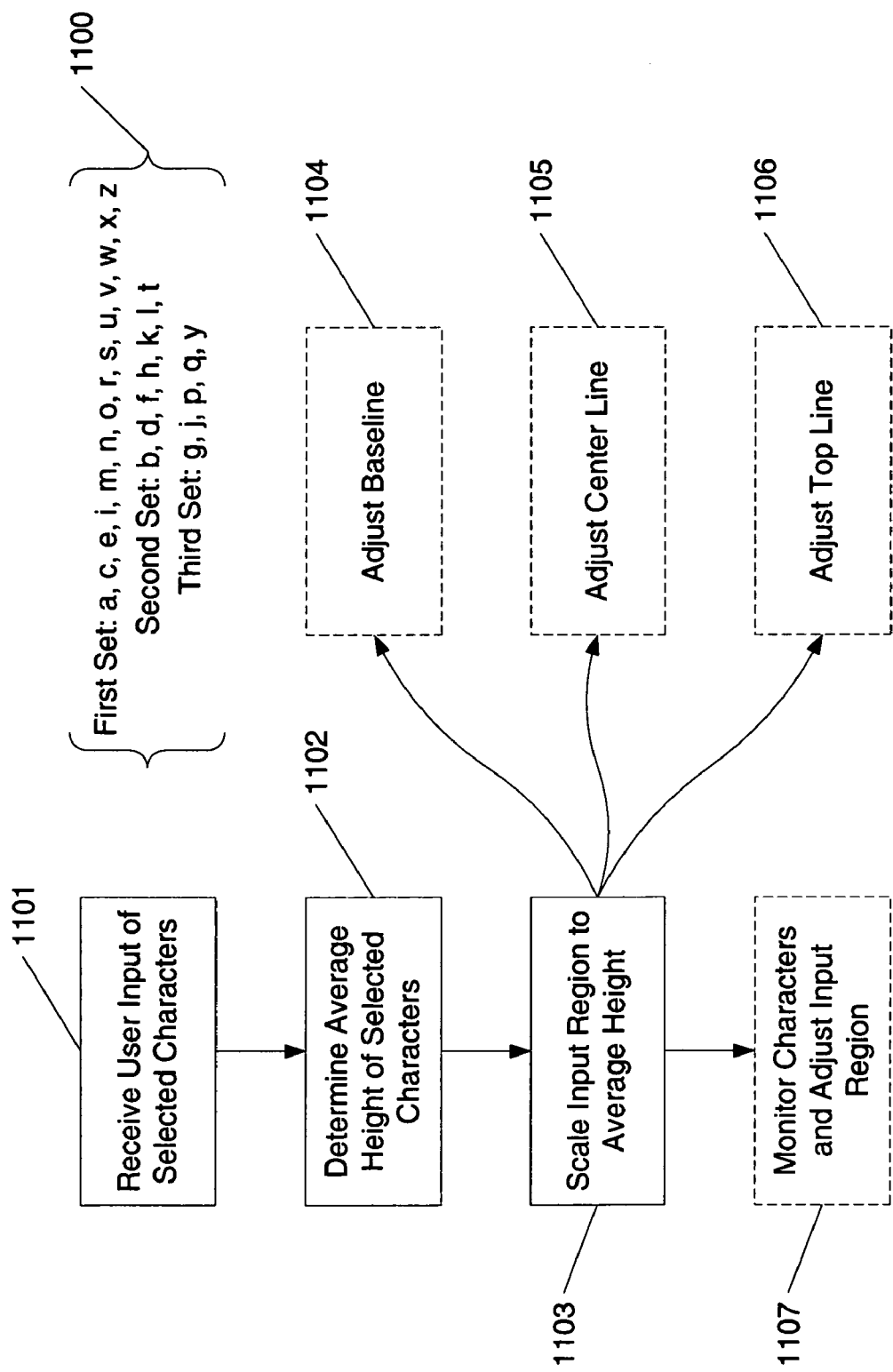
FIG. 11 shows a process for modifying input regions in accordance with aspects of the present invention.

Another aspect of the present invention relates to using normal characters to set an input size for future handwriting. This may or may not be used in conjunction with the creation of an ink font. For instance, one may adjust the ruled lines of stationary to accommodate the size of a user's handwriting, thereby making the user more comfortable in handwriting information. FIG. 11 shows an illustrative process for adjusting input regions based on user input of at least some characters.

In step 1101, the system receives user input of selected characters. The selected characters may include normal characters, ascent characters, descent characters, or some combination. The selected characters may further, optionally, be input in sets as illustrated in group 1100 (with the first set including normal characters, the second set including ascent characters, and the third set including descent characters).

In step 1102, the system determines the average height of the selected characters. In step 1103, the system scales the input region to comport with the average height of the input characters. The adjustment of the height may include at least one of adjusting a baseline in step 1104, adjusting a center line 1105, and adjusting a top line 1106. For instance, the distance between the centerline and the base line may be modified independent of the distance between the baseline and the top line. Alternatively, one may modify the distances between the baseline, centerline, and top line together.

The resulting adjustment based on the selected characters received in step 1101 may then be applied to future handwritten ink input regions. Alternatively, in step 1107, the system may further monitor characters and adjust input regions to accommodate the changing handwriting size.

The present invention has been described in terms of preferred and exemplary embodiments thereof. Numerous other embodiments, modifications and variations within the scope and spirit of the appended claims will occur to persons of ordinary skill in the art from a review of this disclosure.

I claim:

1. A method for adjusting an input region comprising the steps of:
   receiving handwritten characters in an input region on a display;
   determining an average height of the received characters; and
   adjusting the position of one of a baseline, a center line, or a top line of the input region, independantly of each other, based on the average height of the received characters.

2. The method according to claim 1, wherein the received characters include normal characters.

3. The method according to claim 1, wherein the received characters include ascent characters.

4. The method according to claim 1, wherein the received characters include descent characters.

5. The method according to claim 1, wherein the handwritten characters are received from a digitizer.

6. The method of claim 1, wherein the position of the center line of the input region is adjusted based on the average height of the received characters without adjusting the top line or the base line.

7. A system for adjusting an input region comprising:
   means for receiving handwritten characters in an input region on a display;
   means for determining an average height of the received characters; and
   means for adjusting the position of one of a baseline, a center line, or a top line of the input region, independently of each other, based on the average height of the received characters.

8. The system according to claim 7, wherein the received characters include normal characters.

9. The system according to claim 7, wherein the received characters include ascent characters.

10. The system according to claim 7, wherein the received characters include descent characters.

11. The system according to claim 7, wherein the means for receiving handwritten characters includes a digitizer.

12. The system of claim 7, wherein the position of the center line of the input region is adjusted based on the average height of the received characters without adjusting the top line or the base line.

13. One or more tangible computer readable media storing computer executable instructions which, when executed, cause a computer to perform at least the following steps:
   receiving handwritten characters in an input region on a display;
   determining an average height of the received characters; and
   adjusting the position of one of a baseline, a center line, or a top line of the input region, independantly of each other, based on the average height of the received characters.

14. The computer readable media of claim 13, wherein the computer executable instructions further cause the computer to perform the step of: saving the adjusted position of at least one of the baseline, the center line, and the top line.

15. The computer readable media of claim 14, wherein the computer executable instructions further cause a computer to perform the step of: initializing the character input region using the saved position of at least one of the baseline, the center line, and the top line.

16. The computer readable media of claim 13, wherein the identity of the received handwritten characters is predetermined.

17. The computer readable media of claim 13, wherein the received handwritten characters are selected from a predetermined set of characters.

18. The computer readable media of claim 13, wherein the received handwritten characters are received from a digitizer.

19. The computer readable media of claim 13, wherein the position of the center line of the input region is adjusted based on the average height of the received characters without adjusting the top line or the base line.

* * * * *